Feb. 6, 1968 J. D. ENSIGN ET AL 3,367,186
RESISTANCE THERMOMETER
Filed Aug. 27, 1965
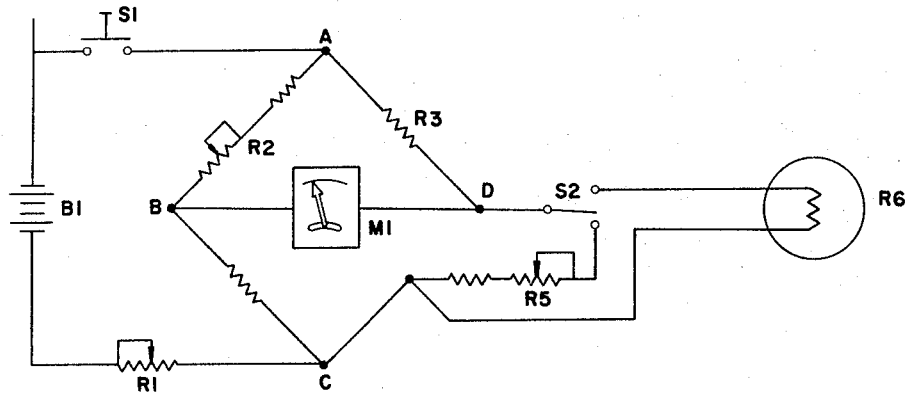
FIG. 2
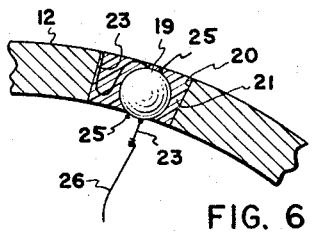
FIG. 7
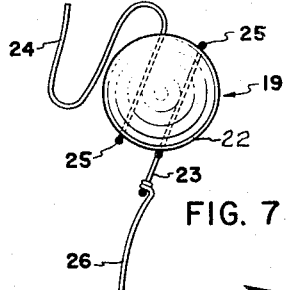
FIG. 6
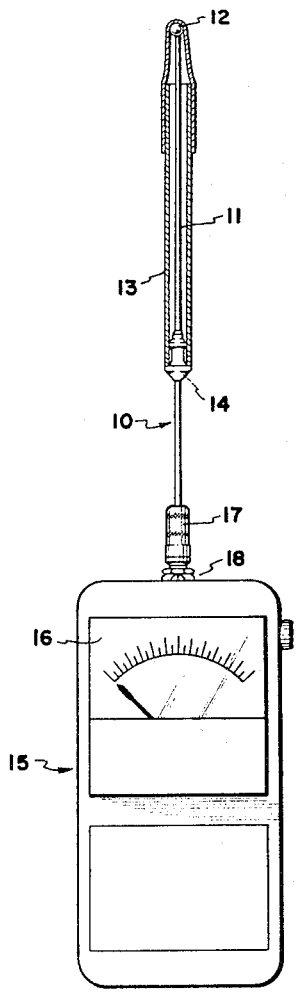
FIG. 1
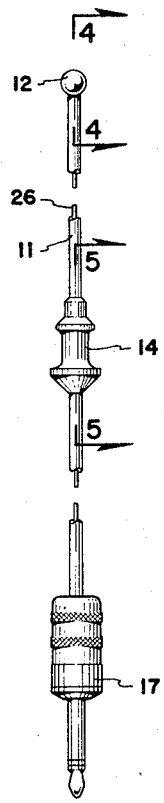
FIG. 3
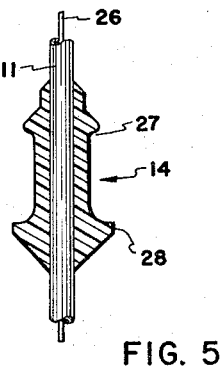
FIG. 4
FIG. 5
INVENTORS
JOHN D. ENSIGN
DAVID M. ALLEN
BY *Mallinckrodt and Mallinckrodt*
ATTORNEYS United States Patent Office 3,367,186
Patented Feb. 6, 1968

3,367,186
RESISTANCE THERMOMETER
John D. Ensign, Brigham City, and David M. Allen, American Fork, Utah, assignors to Measurement Science Corporation, Perry, Utah, a corporation of Utah
Filed Aug. 27, 1965, Ser. No. 483,038
1 Claim. (Cl. 73—362)

ABSTRACT OF THE DISCLOSURE

A resistance thermometer having a housing with a dial on the face, a bridge circuit therein, and a probe adapted to be plugged into the housing and circuit and including a spherical body contact element made of thin walled, conductive metal and a thermistor embedded in the wall of the body contact element and bonded in place with a conductive adhesive.

Brief description

This invention relates to electronic thermometers of the resistance type, which are principally used for measuring body temperatures of human beings and animals but that may also be used in industrial process control operations to spot check material temperatures, etc.

The problems inherent in the measuring of body temperatures of human beings and livestock in an efficient and expeditious manner are well known. Conventionally, this has been done with the well known mercury thermometer that provides an accurate measurement of body temperature, but that must be placed in body cavities for long periods of time to satisfactorily obtain body temperature. These thermometers are difficult to read and, because of their glass construction, are very fragile. The slow response time and fragile construction present difficulties in the taking of temperatures. For example, in measuring the body temperature of a human being, it may be necessary for the patient whose temperature is being measured to hold the glass thermometer in his mouth for a relatively long period of time, with attendant discomfort and distress. The body temperatures of small babies and young children are difficult to obtain and are most frequently taken by inserting a glass thermometer in the rectum of the patient. The response time for a thermometer used in this procedure is normally even longer than when the temperature is taken orally. Naturally, the child does not like to be held still for such a long period of time and may try to expel the thermometer, or it may be broken. In any event, the child becomes very restless during the long period of waiting. Even after the temperature has been obtained the difficulty in reading may result in error.

There have been prior attempts to overcome the problems encountered in using mercury thermometers. One device developed for the purpose is a resistance measuring thermometer that has a long cord connecting a glass enclosed sensing probe with a housing containing an indicator and the necessary electrical circuitry. However, this device has not been found to be a satisfactory solution to all of the above noted problems, since it also has an unduly long response time, in some instances as great as 4 or 5 minutes. Furthermore, two hands are frequently required to hold the housing and to place the probe into a body opening and this is not desirable since the person taking the temperature may need one hand with which to hold the individual or animal whose temperature is being taken. This previously known device also fails to provide any means by which a disposable sheath can be held on the probe, and its probe cannot be satisfactorily sterilized.

It is an object of the present invention to provide an electrical resistance thermometer, especially adapted for measuring body temperatures, that has a relatively short response time, and a probe which can be inserted in a body opening and a reading taken therefrom while the instrument is being held in only one hand of the person taking the temperature. Another object is to provide such an electrical resistance thermometer having a probe that can be readily sterilized and that can be easily fitted with a disposable sheath.

A feature of this invention is a relatively stiff temperature sensing probe that is directly attached to a meter housing so that they can easily be manipulated with one hand. The probe is easily removed from the housing to be sterilized and can readily be interchanged with other probes of the same type. It also has a retaining member adapted to position disposable sheathes and to hold them securely in place during use. The probe also includes a highly sensitive body contact element which contains a very small mass of highly conductive material that is conductively connected to an electrical resistance, the value of which changes with the temperature of the mass, and that is imbedded in a wall of an enlarged end of a tube made of easily cleaned material.

Additional objects and features of the invention will become apparent from the following detailed description of the presently preferred specific embodiment illustrated in the accompanying drawing as an example of how the generic inventive concepts here disclosed can be applied in practice.

Referring to the drawing:

FIG. 1 represents a front elevation of a resistance thermometer conforming to this invention, showing a probe connected to a housing having a meter with a dial indicator, and with a probe sheath, shown in section, attached to the probe.

FIG. 2 represents a schematic layout of the electrical resistance measuring circuit contained within the housing;

FIG. 3, an enlarged, side elevation view of a probe of the type shown connected to the housing in FIG. 1, partially broken out for convenience of illustration;

FIG. 4, a longitudinal cross section taken on the line 4—4 of FIG. 3;

FIG. 5, a similar view taken on line 5—5 of FIG. 3;

FIG. 6, an enlarged detail representation of the section taken within line 6—6 of FIG. 4; and FIG. 7, a still further enlarged view in side elevation of the variable electrical resistance element used in the invention.

Referring now to the drawing, tube 11 supports a conductive body contact element 12 and forms a probe 10 of an electronic thermometer for measuring body temperature. Probe 10 is directly attached to electrical circuit housing means 15, which also supports a dial 16 for indicating the temperature of body contact element 12. Disposable sheath 13 is held on probe 10 by retaining means 14.

Housing 15 can be of any convenient size, however it is preferred that the housing means be of a size such that it can be easily placed in the hand of an individual using it, and completely manipulated, insofar as the temperature taking operation is concerned, by the individual in this position. A suitable housing means can be a box constructed of stainless steel, corrugated metal, plastic or any other suitable material of construction. It is an important feature of this invention that probe 10 is constructed to be directly connected to housing means 15. With this construction, an individual holding housing means 15 in his hand can easily guide and insert probe 10 into a body opening of a subject. This feature, coupled with the relatively rapid response of the measuring apparatus to body temperature, is largely responsible for the principal advantage of the thermometer shown, since it can be easily and quickly used to determine the body temperature of a patient while being held in one hand. Obviously however, if it were desired to have a long extension between the housing element and the probe, it would be a simple matter to provide an extension cord having the necessary fittings to connect them. Tube 11, is preferably sufficiently rigid to enable probe 10 to be positioned as desired by manipulation of housing 15 in order that the thermometer can be utilized in this manner. Although tube 11 can be of a flexible material, without detracting from the measurement accuracy of the thermometer, the foregoing advantage can only be realized if the tube is somewhat rigid.

Tube 11 is preferably constructed of stainless steel, however other materials can be substituted, such as for example fiberglass, Teflon, copper, and the like. Selection of the material for tube 11 depends, among other things, upon the circuitry and conductivity requirements of the particular electronic measuring circuit utilized. Thus, if tube 11 is to be used as a conductor in the circuit, as in the presently preferred embodiment of the invention, then the tube, in addition to being semi-rigid, must be capable of conducting electricity. However if the tube is not used in the circuit to conduct electricity, it can be made of nonconductive material.

A convenient method of attaching probe 10 to housing means 15 is by means of a conventional circuit connection, such as an electrical jack. The connector end of the probe is constructed to form a plug 17 which is inserted into an electrical jack 18 located in housing means 15. With this arrangement probe 10 can be easily and quickly removed from housing 15 for sterilization. Since the plugs 17 are standard, probes 10 are interchangeable, and therefore a sterilized probe can be installed on housing 15 while a previously used probe is being sterilized.

The construction of conductive body contact element 12 and the variable electrical resistance element 19 imbedded therein is an important feature of the invention, since it is the construction and composition of these elements that contribute significantly to the overall fast response of the present electronic thermometer. The presently preferred conductive body contact element 12 is a hollow metal sphere. Although any heat and electrical conductive metal, or metallic material can be used as the material for body contact element 12, a sterling silver hollow bulb is presently preferred for this purpose. These bulbs have been found to exhibit an extremely rapid response to ambient temperature. It is an important criterion of the body contact element that it be small so that it can be almost instantaneously heated to a temperature corresponding to the ambient temperature around the element. From this standpoint, sterling silver has been found to be particularly useful as the material for body contact element 12, since a small sized element can be constructed with the necessary wall strength.

A variable electrical resistance element 19, of the type whose electrical resistance varies in inverse relationship with the ambient temperature around the element, is installed in the body contact element 12. This type of an electrical resistor is commonly called a thermistor in the electrical arts. A variety of commercial thermistors are presently available on the market and can be used, with a commercial thermistor having a sintered metal body being preferred. It is possible to locate the resistance element 19 in any area of body contact element 12, where it will be in sufficient contact with element 12 to attain the same temperature as the element within a reasonable time. However, excellent results have been obtained when resistance element 19 is installed in a small drilled hole 20 in the wall of body contact element 2 as shown in FIGS. 4 and 6. Although resistance element 19 can be placed in hole 20 in any manner, it is desirable to insert element 19 in the hole 20 far enough so that it does not protrude past the outer perimeter defined by the normal periphery of body contact element 12. This enables body contact element 12 to be finished with a smooth outer perimeter, and without bumps or sharp projections that might puncture a user. Resistance element 19 can be fixed to body contact element 12 in any manner, provided that heat and electricity can be conducted to it. The presently preferred manner is to pack resistance element 19 in place with a conductive adhesive 21. Conductive epoxy resin is preferred for this purpose, however other conductive resinous, elastomeric or polymeric substances can be used.

FIG. 7 shows a variable resistance element 19 of the type that is presently preferred for use. This variable resistance element comprises a body 22 of a material which exhibits a resistance that is inversely proportional to the ambient temperature around the body. A wire and a stub ordinarily extends from each end of the resistince element, the wire on one end being connected to the stub on the other end. In FIG. 7 the wire at the top of variable resistance element 19 is bent in a loop to provide a ground wire 24. The bottom wire 23 is insulated and attached to Teflon coated head wire 26 by solder or other suitable attachment means. The stub 25, which is the other end of wire 23, is insulated with a thin protective coating to prevent shorting of the resistance element. When resistance element 19 is placed in use in a conductive body contact element 12, wire 24 is bent in an S shape to facilitate conductive contact with element 12. Lead wire 26 is passed through tube 11, FIG. 4. The lead wire is connected at its other end to plug 17 of the probe and conductive packing material 21 completes the conductive circuit by providing a conductive passage between wire 24 and conductive body contact element 12. The probe 10 thus forms an open end circuit having two connected conductive paths formed through lead wire 26 and contact element 12 and tube 11, connected to variable resistance element 19. The probe can then be attached to any suitable circuit which will effectively measure the values of variable resistance element 19.

The schematic diagram shown in FIG. 2 represents an off-set bridge circuit which is presently preferred to determine the resistance in variable electrical resistance element 12. Since bridge circuits are well known, a detailed discussion of the operation of bridge circuits will not be presented here. Basically this circuit consists of fixed resistors R3 and R4, variable resistors R2, R5 and R1, battery B1, switches S1 and S2, and variable electrical resistance element R6, which is the resistance contained in variable electrical resistance element 19 previously mentioned. Standard electrical resistors can be used, and the variable resistors can comprise a fixed resistor in series connection with a variable resistor. When probe ously balanced. Since the change in the resistance R6 is added to the circuit and switch S2 is automatically closed. Since the resistance of element 19 (resistance R6) changes in inverse proportion to the ambient temperature surrounding the element, an imbalance in the bridge circuit, caused by a change in resistance R6, will result in a deflection on galvanometer M1 if the circuit has been previously balanced. Since the change in the resistance R6 is basically proportional to the change of temperature, in a given temperature range, galvanometer M1 can be calibrated in degrees of temperature, to indicate the ambient temperature surrounding resistance R6. In addition to accurately measuring temperature, the circuit can be calibrated and tested quite easily. The calibration and testing of the circuit will be explained with reference to the following specific example, which demonstrates the unique operation of the electronic thermometer of this invention.

Specific example

An electronic thermometer having a probe and resistance measurement circuit as shown in the accompanying drawing had the following makeup.

B1 ......... 4.2 v.
R1 ......... 1000 ohms.
R2 ......... 1600 ohms fixed plus 500 ohms variable.
R3 ......... 1800 ohms ±10%.
R4 ......... 1800 ohms ±10%.
R5 ......... 1800 ohms fixed plus 500 ohms variable.
R6 ......... 3500 ohms at 77° F. ±10%.
M1 ......... 0–50 μamps, 2000 ohms, 94°–106° F.

The circuit with the probe in place, was calibrated in the following manner to prepare it for use: Probe 10 containing resistance R6 was placed in a water bath at a temperature of 94° plus or minus .1° F. This caused resistance R6 to drop to approximately 2800 ohms. Switch S1 was pressed and held, and R2 was adjusted so that the ratio R2 over R4 equalled the ratio of R3 over R6. Accordingly the voltage drops VR2 equalled VR3 and VR4 equalled VR6, the voltage between points B and D of the circuit was 0 and the current through galvanometer M1 was 0 which corresponded to 94° F. on the meter scale. The probe was then placed in a water bath at 106° F. plus or minus .1° F. This caused the resistance of R6 to drop to approximately 2300 ohms. Button S1 was then pressed and the voltage between points A and C was adjusted by adjusting voltage R1 until the meter read 106° F. The foregoing steps were repeated to verify the calibration and insure its accuracy. Switch S1 was then closed, and probe 10 was removed so switch S2 could be actuated to include resistance R5 in the circuit. Resistance R5 was then adjusted so the meter read 105° F., thus establishing a check reading, which would vary with any variation in the battery voltage. The calibrated electronic thermometer was then tested for accuracy. It was found that in a series of temperature measurements that the accuracy was within plus or minus .1° F. of the actual temperature over the short temperature span used on the meter. It was also determined in a series of tests that response time was in the range of 3 to 12 seconds depending upon initial probe temperature and the location on the patient's body at which the temperature was obtained.

From the foregoing data and observations, it was observed that the thermistor resistance versus temperature characteristics were very linear providing for very accurate temperature measurement over the narrow temperature span from 94 degrees to 106 degrees F. This temperature span was found to be short enough to provide good resolution on the meter, but long enough to cover extremes of human or animal body temperature.

A disposable sheath 13 is shown in section, FIG. 1, covering the end of probe 10. It is an advantage of the electronic thermometer and probe of this invention that they can be used in connection with a disposable sheath 13. For this reason a sheath retaining means 14, shown in FIGS. 1, 3 and 5, is fixed to and surrounds the tube 11 such that it provides an abutment stop and a friction gripping means for the sheath. In FIG. 5 the friction gripping means 27 and abutment stop 28 are shown on sheath retaining means 14 as protuberances. This enables the thermometer to be used without contamination since the sheath is disposable and can be removed and discarded after each use. The details of a suitable sheath and sheath retaining means are disclosed and claimed in the copending application of John D. Ensign and Hideo Hashimoto entitled, "Probe Sheath and Sheath Retainer," Ser. No. 489,122, filed Sept. 22, 1965.

Whereas this invention is here illustrated and described with respect to a particular preferred construction it is to be understood that reasonable modification and variation can be made therein without departing from the scope of the claim which follows.

We claim:

1. An electronic thermometer for measuring body temperature comprising, in combination
   a housing for an electrical circuit;
   a dial mounted on said housing;
   an elongate temperature sensing probe extending from said housing and being sufficiently rigid that the probe is positioned, as desired, by manipulation of the housing, and said probe including a body contact element comprising a hollow, spherical, thin walled shell of sterling silver, a stainless steel tube connecting said contact element to said housing and a variable resistance element having an electrical resistance variable with ambient temperature positioned in the wall of said hollow shell and surrounded by a conductive epoxy resin, whereby the variable resistance element is quickly heated to the same temperature as said body contact element; and
   electrical circuitry comprising an offset electrical bridge circuit including said variable resistance element in one leg thereof, all of said circuit except the variable resistance element and the leads thereto being positioned in the housing, and a galvanometer calibrated in degrees of temperature corresponding to the temperature of said variable resistance operatively attached to said bridge circuit and to the dial mounted on the housing, whereby the temperature of said body contact element will be indicated on the said dial.

References Cited
UNITED STATES PATENTS

| | | | |
|---|---|---|---|
| 2,938,385 | 4/1960 | Mack et al. | 73—362 |
| 3,025,706 | 3/1962 | Oppenheim | 73—362 |
| 3,082,625 | 3/1963 | Zimmerman | 73—362 |
| 3,139,753 | 7/1964 | Brudner | 73—362 |
| 3,147,457 | 9/1964 | Gill et al. | 73—362 |
| 3,153,769 | 10/1964 | Moses | 73—362 |
| 3,177,560 | 4/1965 | Argamakoff | 338—22 |
| 3,221,555 | 12/1965 | Bibber | 73—362 |
| 3,254,533 | 6/1966 | Tongret | 73—362 |

DAVID SCHONBERG, *Primary Examiner.*

LOUIS PRINCE, *Examiner.*

N. B. SIEGEL, *Assistant Examiner.*